US008868241B2

(12) United States Patent
Hart et al.

(10) Patent No.: US 8,868,241 B2
(45) Date of Patent: Oct. 21, 2014

(54) ROBOT TASK COMMANDER WITH EXTENSIBLE PROGRAMMING ENVIRONMENT

(71) Applicant: GM Global Technology Operations LLC, Detroit, MI (US)

(72) Inventors: Stephen W Hart, Houston, TX (US); John D. Yamokoski, Houston, TX (US); Brian J Wightman, Seabrook, TX (US); Duy Paul Dinh, Houston, TX (US); Dustin R Gooding, League City, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 107 days.

(21) Appl. No.: 13/803,017

(22) Filed: Mar. 14, 2013

(65) Prior Publication Data

US 2014/0277743 A1    Sep. 18, 2014

(51) Int. Cl.
*B25J 9/16*    (2006.01)

(52) U.S. Cl.
CPC ..... *B25J 9/1661* (2013.01); *G05B 2219/40099* (2013.01)
USPC ........................... 700/264; 700/245; 700/248

(58) Field of Classification Search
CPC .......... B25J 9/16; B25J 9/1602; B25J 9/1656; B25J 9/00
USPC ......................................... 700/264, 246, 248
See application file for complete search history.

(56) References Cited

U.S. PATENT DOCUMENTS 8,260,460 B2     9/2012 Sanders et al.
2007/0150102 A1*  6/2007 Park et al. ................... 700/245

OTHER PUBLICATIONS

Sattar, Junaed; Xu, Anqi; Dudek, Gregory; and Charette, Gabriel; "Graphical State-Space Programmability as a Natural Interface for Robotic Control", IEEE, 1050-4729, pp. 4609-4614, May 3-7, 2010.*
Li, Jimm; Xu, Anqi; and Dudek, Gregory; "Graphical State Space Programming: A Visual Programming Paradigm for Robot Task Specification", IEEE, 1050-4729, pp. 4846-4853, May 9-13, 2011.*

* cited by examiner

*Primary Examiner* — Mark Cheung
*Assistant Examiner* — Brian P Sweeney
(74) *Attorney, Agent, or Firm* — Quinn Law Group, PLLC

(57) ABSTRACT

A system for developing distributed robot application-level software includes a robot having an associated control module which controls motion of the robot in response to a commanded task, and a robot task commander (RTC) in networked communication with the control module over a network transport layer (NTL). The RTC includes a script engine(s) and a GUI, with a processor and a centralized library of library blocks constructed from an interpretive computer programming code and having input and output connections. The GUI provides access to a Visual Programming Language (VPL) environment and a text editor. In executing a method, the VPL is opened, a task for the robot is built from the code library blocks, and data is assigned to input and output connections identifying input and output data for each block. A task sequence(s) is sent to the control module(s) over the NTL to command execution of the task.

18 Claims, 3 Drawing Sheets

ROBOT TASK COMMANDER WITH EXTENSIBLE PROGRAMMING ENVIRONMENT

STATEMENT REGARDING FEDERALLY SPONSORED RESEARCH OR DEVELOPMENT

This invention was made with government support under NASA Space Act Agreement number SAA-AT-07-003. The United States Government may have certain rights in the invention.

TECHNICAL FIELD

The present disclosure relates to systems and methods of task planning for an automated robot, and in particular to a robot task commander having an extensible programming environment that can be used for such task planning

BACKGROUND

Robots are automated devices that are able to manipulate objects using a series of mechanical links. The links are interconnected via motor/actuator-driven robotic joints. Each joint in a typical robot represents an independent control variable, i.e., a degree of freedom. End-effectors are the particular devices located at the end of a robot manipulator used for performing a task at hand, such as grasping a work tool or capturing a 3D image of an object. Therefore, precise control of a robot may be organized by the level of task specification: object level control, i.e., the ability to control the behavior of an object held in a single or cooperative grasp of a robot, end-effector control, and joint level control. Collectively, the various control levels cooperate to achieve the required levels of robotic mobility, dexterity, and work task-related functionality.

Robots vary in complexity ranging from conventional 3-axis or 6-axis robotic arms to highly complex humanoid robots, i.e., robots having human-like structure or appearance, whether as a full body, a torso, and/or an appendage. The structural complexity of a humanoid robot depends largely upon the nature of the work task being performed. Typically, each robot has its own dedicated programming environment wherein expert users program the various tasks that must be executed according to a particular task sequence. The programming code is then compiled, with communications protocols rewritten whenever new peripheral devices and other hardware elements are added to the robot. As a result, certain task programming inefficiencies may exist in the art, particularly in larger networked environments utilizing robots of differing designs and/or with a wide disparity in relative complexity.

SUMMARY

A system is disclosed herein that includes a robot task commander (RTC). The RTC is intended for development of distributed robot application-level software, i.e., software that is not real-time critical, as is well understood in the art. The RTC may be embodied as a set of programs running on one or more computer devices, including an Integrated Development Environment (IDE) with a graphical user interface (GUI) and one or more programs configured to function as respective script engines. The GUI acts as a graphical "front end" to the RTC, allowing an expert or non-expert user to interface with the script engines in an intuitive manner. The GUI also enables a user to view run-time diagnostic information, to compose new scripts that can be stored in memory and accessed via a graphical file browser, and to "drag-and-drop" such stored scripts as "code library blocks" into new sequences. The task sequences are likewise stored in memory for hierarchical re-use as "task sequence blocks" in additional sequences.

The GUI allows the user to deploy task sequence blocks as "applications" to the script engine(s). In turn, the script engines act as the computational "back end" of the RTC. Sub-blocks within an application may be assigned to specific script engines that must then interpret and execute those particular blocks in a designated sequence order. Therefore, the script engines are responsible within the system for transmitting program sequence data to other script engines as well as for communicating diagnostic feedback to the GUI. Diagnostic feedback as used herein may take two forms: a text window in the GUI, and "block highlighting", such that when an application is deployed to the script engine(s), the corresponding blocks in the GUI may turn different colors, e.g., green to indicate proper execution, red to indicate an error or fault, etc.

Use of the RTC as disclosed herein facilitates automated robot task planning in a networked environment wherein one or more robots are controlled over a network transport layer (NTL) by multiple computing devices. The RTC is designed to support multiple network protocols, for instance the Robot Operating System (ROS), ZeroMQ, TCP/IP, UDP, etc., for implementing the network communication between different script engines, the RTC GUI, and one or more robot/peripheral devices without being unique to any particular protocol. As applications may consist of task sequences of multiple blocks distributed over a wide network at multiple script engines using these protocols, network latencies may exist. However, such latencies are entirely acceptable within the context of the RTC's intended application-level software development role.

The script engines used by the RTC may reside on different computers on the network. Each script engine can send "trigger commands" to other script engines, e.g., as a set of coordinated state machines executing in parallel. In such an environment, the GUI allows a user to understand at a glance precisely what is occurring throughout the various distributed script engines. Also, the distributed approach allows for computational load across the network to be balanced if particular library script or sequence blocks, referred to collectively hereinafter as "code library blocks", are particularly intensive, for instance in the case of sensor/image fusion or image processing algorithms.

In a possible approach, a given script engine could be dedicated to a corresponding robot on the network. Likewise, each task sequence and code library block could be run on a different script engine on a different computer. In general, the deployment of each block can be set by the user in the GUI before deployment, or automatically assigned to the script engine(s) on the network through standard scheduling algorithms such as "round robin" or the like, as is well understood in the art. The particular trigger events that connect the various blocks are sent over the NTL, thereby allowing the RTC to function properly even in a widely distributed network environment. The task sequences themselves need not be linear. That is, a single trigger command could trigger execution of multiple blocks of code at the same time, thereby initiating a concurrent or parallel processing pipeline, and so forth.

The RTC described herein uses script blocks that are specifically written to accept "input" data from a robot and/or sensor data being published over the NTL, as is understood in the art, as well as to publish "output" data to the NTL itself. Upon composition in the GUI of the RTC, the scripts must be written "abstractly", i.e., agnostic to any specific input/output (I/O) data bindings. In such a way, each individual script block only knows about the type of information, e.g., joint positions, joint velocities, image coordinates, etc., and not the specific source of that information. It is left to the user to "bind" the sources and sinks of this I/O data in the VPL using an intuitive graphical interface when composing code blocks in task sequences and/or applications. Thus, central to the present approach is the ability to use and reuse such abstract functionality in the form of library scripts, in different applications, while possibly connecting to different hardware devices. These concepts are discussed in further detail below.

As will be appreciated by those having ordinary skill in the art, the RTC disclosed herein may provide various advantages relative to existing command and control approaches. Such approaches may be poorly suited to interfacing with newly added peripheral hardware devices such as sensors, manipulators, and/or third party software in a uniformly consistent way when creating new robot task applications. On-line feedback of both program state and robot telemetry data, which may be useful for run-time introspection and diagnostics of tasks in progress, may also be lacking in the prior art. Integrated support is provided for leveraging external software packages via communication over the NTL, and it is the integrated support of multiple network protocols that make this possible. Together, these features can enable rapid prototyping and deployment of advanced robot programming techniques suitable for the next generation of flexible general assembly manufacturing systems, space exploration systems, and the like. As an added benefit, by using the RTC, communication protocols need not be rewritten whenever new hardware is added to the network.

In a particular embodiment disclosed herein, the system specifically includes a robot with an associated control module. The control module controls the motion of at least one joint of the robot in response to a commanded task. The system also includes the RTC described above, which is in networked communication with the control module over the NTL. The RTC includes a processor and memory having a centralized library within which code library blocks may be stored, with each code library block constructed via an associated text editor using an interpretive language computer programming code. Each library code block may also have one or more I/O connections, which are defined herein as the particular I/O links which communicate over the NTL as pointers to input and output data, respectively. The RTC also includes a GUI in communication with the memory. The GUI provides access to both the VPL environment and the text editor.

The RTC executes instructions from memory in response to user commands to thereby open the VPL, and to allow the user to select or develop code for a task to be executed via the robot(s), including selecting and/or developing one or more code library blocks. The selected/developed blocks of code are downloaded over the NTL to the various designated script engines, where the blocks are executed according to the flow path(s) dictated by the particular trigger commands. After the code library blocks are processed via the script engines, each control module subsequently controls the required motion dictated by the task, periodically communicating its state back to the controlling RTC via the script engines. Various embodiments of the foregoing system are set forth in further detail herein.

The above features and advantages and other features and advantages of the present invention are readily apparent from the following detailed description of the best modes for carrying out the invention when taken in connection with the accompanying drawings.

DETAILED DESCRIPTION

Figure 1:
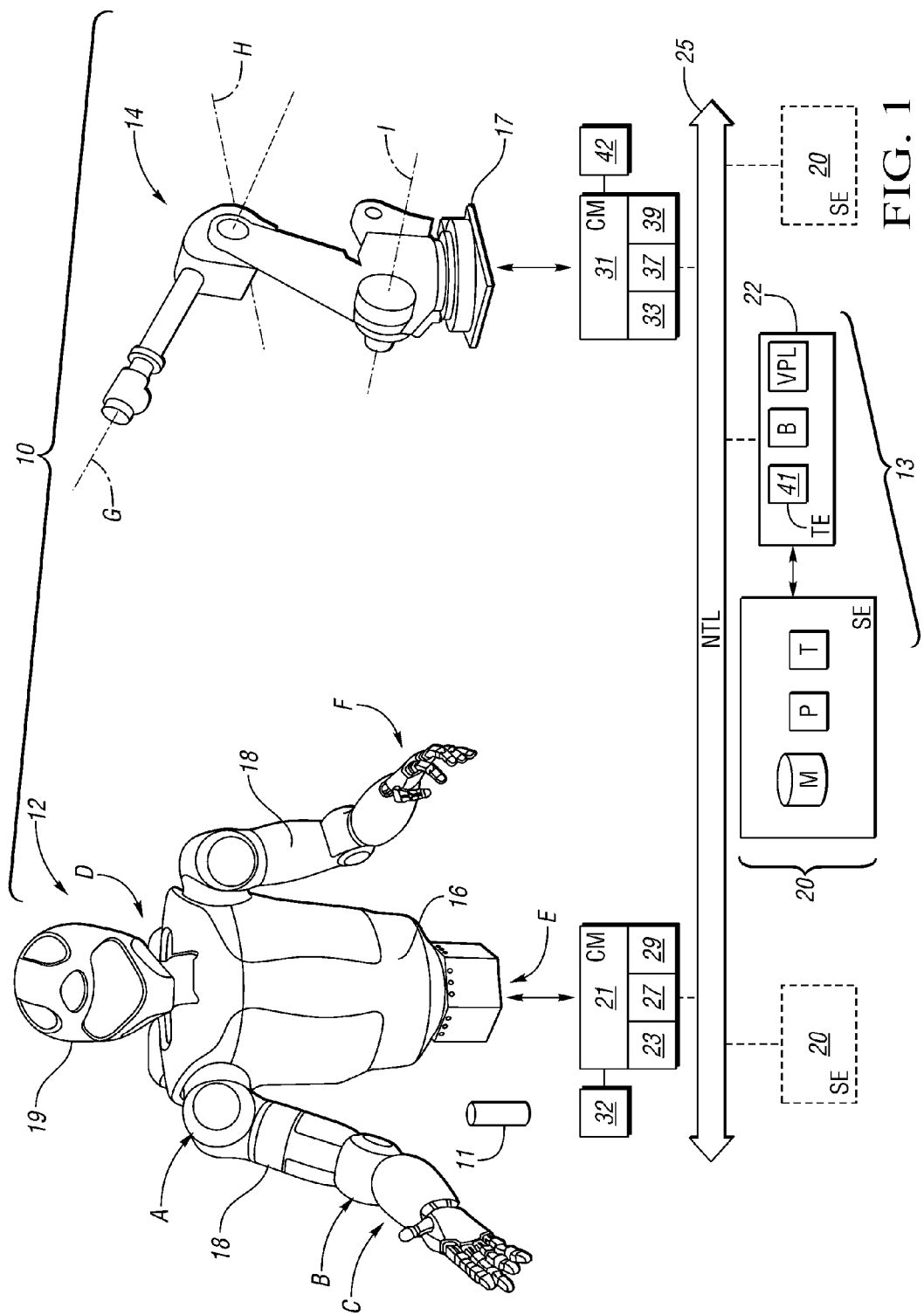
FIG. 1 is a schematic illustration of a distributed robotic system that includes multiple robots, individual control modules, and a robot task commander (RTC) configured as set forth herein.

Referring to the drawings, wherein like reference numbers refer to the same or similar components throughout the several views, FIG. 1 schematically depicts a distributed robotic control network 10. For instance, the control network 10 may include an example humanoid robot 12 and a conventional multi-axis robot 14 as shown, and/or more or fewer robots of greater or less complexity relative to the robots 12, 14. As set forth herein, consolidated robotic task planning for one or more robots is achieved within the control network 10 via a robot task commander (RTC) 13.

Typically, task planning across a distributed control environment is performed at the level of each of the robots 12 and 14, and specifically only for those particular robots 12, 14. The RTC 13, when configured and used as set forth herein, instead provides a graphical integrated development environment (IDE) which allows use of a Visual Programming Language (VPL) to write new programming code. This occurs in a first layer, i.e., a graphical user interface (GUI) 22, which thus acts as a graphical "front end" to the RTC 13 as noted above.

The GUI 22, which may be hosted on a suitably configured computer device, allows a user to create new program scripts, store the scripts as graphical blocks, and then start, pause, and stop execution of these blocks at runtime as needed while receiving runtime diagnostic feedback. In such a way, the GUI 22 may be used for both the development and deployment of applications, where the term "application" is used to denote any "top-level" sequence block that can be dispatched to one or more RTC script engine(s) 20, which in turn provides a second layer of control. The GUI 22 may include or provide access to a text editor (TE) 41, the VPL noted above, and a library browser (B) displaying the scripts and blocks that have already been created. Thus, the dichotomy of a graphical IDE via a single GUI 2, and potentially many distributed script engines 20, facilitates software prototyping and high-level task planning across a distributed environment. Control modules (CM) 21, 31 provide a third layer of control, with all three layers described in further detail below. Although not shown for simplicity, the GUI 22 may open an associated window for each block when the block is clicked on in the IDE. This concept is described in further detail below with reference to FIG. 2.

In a particular embodiment, the humanoid robot 12 of FIG. 1 may have over 42 degrees of freedom (DOF) and perform automated, interactive tasks using other integrated system components such as clamps, 2D or 3D cameras, lights, relays, etc., with human-like levels of dexterity. To achieve such dexterity, the robot 12 may include independently-moveable and interdependently-moveable robotic joints, such as but not limited to a shoulder joint of an arm 18. The position of the shoulder joint is generally indicated by arrow A.

Likewise, an elbow joint is generally indicated by arrow B, with the robot 12 also including a wrist joint (arrow C), a neck joint (arrow D) providing multi-axis movement to a head 19, and a waist joint (arrow E) providing movement of a torso 16, as well as the various finger joints (arrow F) positioned between the phalanges of each robotic finger. Each robotic joint contains and is internally driven by one or more actuators, e.g., joint motors, linear actuators, rotary actuators, and the like. Although not shown in FIG. 1 for illustrative simplicity, the finger joints (arrow F) and/or other joints may be driven via tendons using ball-screw devices.

In contrast to the robot 12, the multi-axis robot 14 may have a much lower degree of relative complexity. For instance, the robot 14 may move with respect to just three axes G, H, and I, and/or it may rotate with respect to a fixed or mobile base 17. Such a robot is typically used in industry to perform repetitive tasks. Example uses of the robot 14 may include paint application, welding, logistics/materials handling, and the like. The two example robots 12 and 14 are intended to illustrate robots having vastly different degrees of freedom relative to each other. The complexity of the robots 12, 14 that are actually used as part of the control network 10 of FIG. 1 may vary depending on the application. For illustrative consistency, the simplified two-robot example embodiment of FIG. 1 will be used hereinafter.

Task execution for each of the robots 12 and 14 is directly controlled via the respective control modules 21, 31, each forming a lower level of control relative to the RTC 13. The control modules 21 and 31 generate or accept commanded inputs or control references for the various joint actuators, e.g., motors, linear actuators, and the like, in the execution of any commanded tasks. While each control module 21, 31 is shown as a single computer device in FIG. 1, the various hardware and software elements of the control modules 21, 31 may be distributed with respect to the robot 12, 14 being controlled.

For example, each joint may have an embedded joint controller in the form of a printed circuit board assembly in communication with a main circuit board (not shown). Regardless of how the physical elements of the control modules 21, 31 are distributed, each control module 21, 31 includes one or more processors 23, 33, one or more transceivers 27, 37, and one or more tangible, non-transitory memory devices 29, 39. Likewise, each control module 21, 31 may have an associated user interface 32, 42 as shown providing a user with access to the robot 12 or 14.

In terms of functionality, each control module 21, 31 is configured to control the motion of the robots 12, 14 in response to received task instructions provided from the RTC 13, after any blocks embodying the programming code or script are processed via the script engine(s) 20. That is, each control module 21, 31 is programmed, equipped, and/or otherwise physically capable of performing all requisite control steps needed for responding to task planning instructions from the RTC 13 without further modification. The control modules 21, 31 provide precise motion control over the fine and gross movements needed for any actions of the robot 12, 14. The RTC 13 effectively tells each control module 21, 31 what to do as opposed to precisely how to do it. The control modules 21 and 31 are programmed or otherwise configured to determine how to execute the top-level tasks assigned by the RTC 13.

Still referring to FIG. 1, the various control modules 21, 31 communicate with the RTC 13 over a network transport layer (NTL) 25, i.e., the particular layer in a computer network that is responsible for forming data packets and delivering the data packets to the various processes and control modules, as is well known in the art. The RTC 13 supports multiple network data transfer protocols for implementing the NTL 25, e.g., ROS, ZeroMQ, TCP/IP, UDP, etc., and is easily extensible to include others at the developers demand through a plug-in architecture as is understood in the art. This capability facilitates integration of the RTC 13 with third-party software and sensors that may have their own particular protocol. Also, the structure and function of the RTC 13 as disclosed herein facilitates fast integration of peripheral input sensory devices such as, but not limited to, cameras, laser range finders, 3D depth sensors, force/torque sensors, inertial measurement units or accelerometers, etc. The I/O blocks can easily be configured to "listen" or "subscribe" to any defined type of sensory data over the NTL 25 that is being generated from such a peripheral device.

Figure 4:
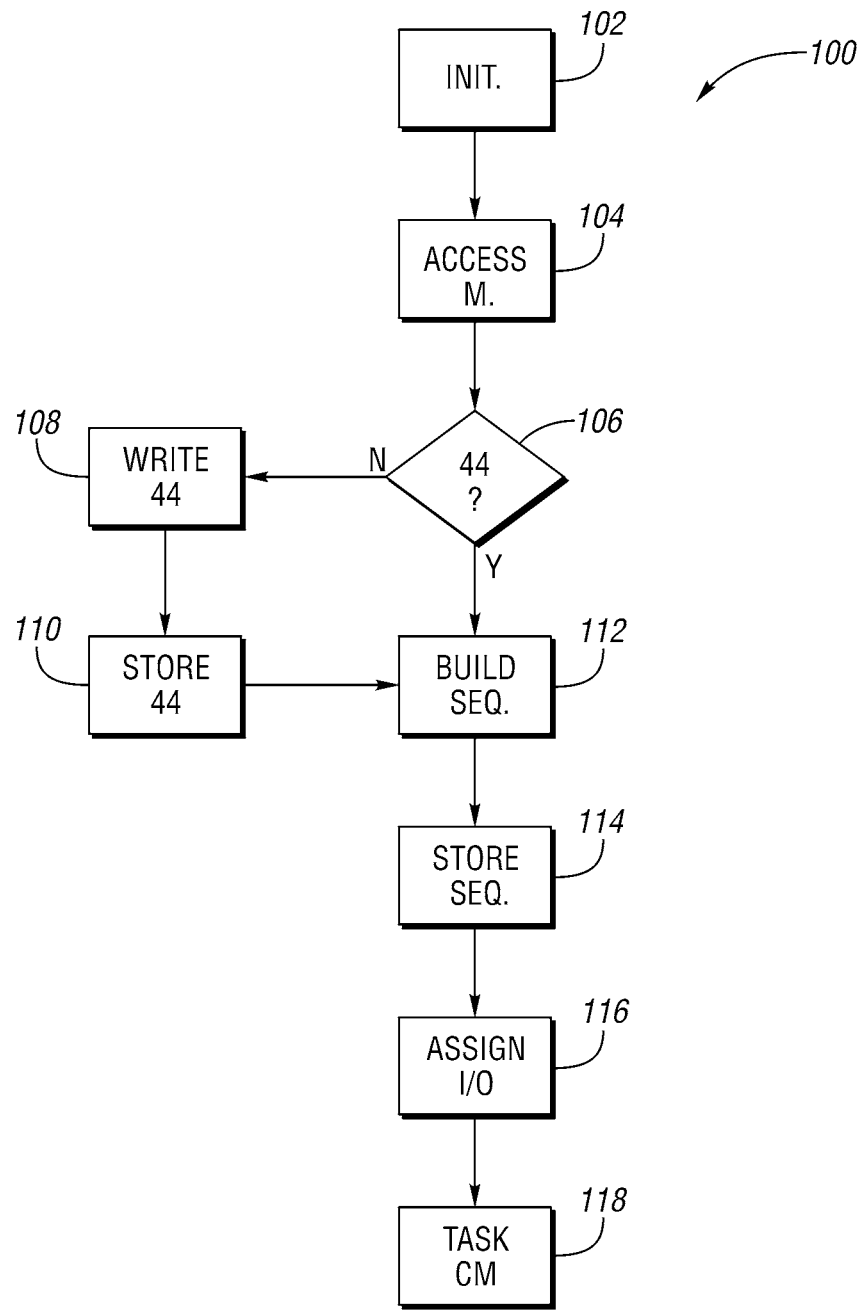
FIG. 4 is a flow chart describing a method for task planning of the robots shown in FIG. 1.

The required functionality of the script engine(s) 20 includes coordinating the flow of programs, i.e., how the various blocks send trigger-events along their various connections to start new blocks, the flow of data between all computational nodes in the control network 10, and the sequencing of reference commands to the control modules 21, 31. Hardware may include tangible, non-transitory memory (M), a processor P, and a transceiver (T), as well as recorded instructions necessary for executing a method 100 as shown in FIG. 4 and described below. Additional hardware may include the A/D, D/A, and I/O circuitry noted above, as well as any other required hardware and software.

As with the control modules 21, 31, the various script engines 20 of the RTC 13 may be executed via one or multiple computers or data processing devices each having one or more processors (P), tangible, non-transitory memory (M) such as read only memory (ROM), optical memory, flash memory, and the like, as well as random access memory (RAM) and erasable electrically-programmable read only memory (EEPROM). The various hardware of the script engine(s) 20 may include a high-speed clock, analog-to-digital (A/D) circuitry, digital-to-analog (D/A) circuitry, and any required input/output (I/O) circuitry and devices, as well as signal conditioning and buffer electronics.

The RTC 13 provides an extensible programming environment for developing, diagnosing, and deploying new robot applications within the network 10 of FIG. 1. Such applications may be used by any robot or sensor connected to the RTC 13 over the NTL 25, whether the high-degree of freedom robot 12 or the relatively low degree of freedom robot 14, and anything in between. The RTC 13 provides an interpretative programming environment, which is an environment in which compiling of computer-executable code is neither required nor used. In this environment, users can easily "drag and drop" existing task planning script blocks from the centralized library, i.e., "code library blocks", into new applications, and/or create new task sequence blocks to address evolving requirements and new hardware. This concept will now be explained with reference to FIG. 2.

Figure 2:
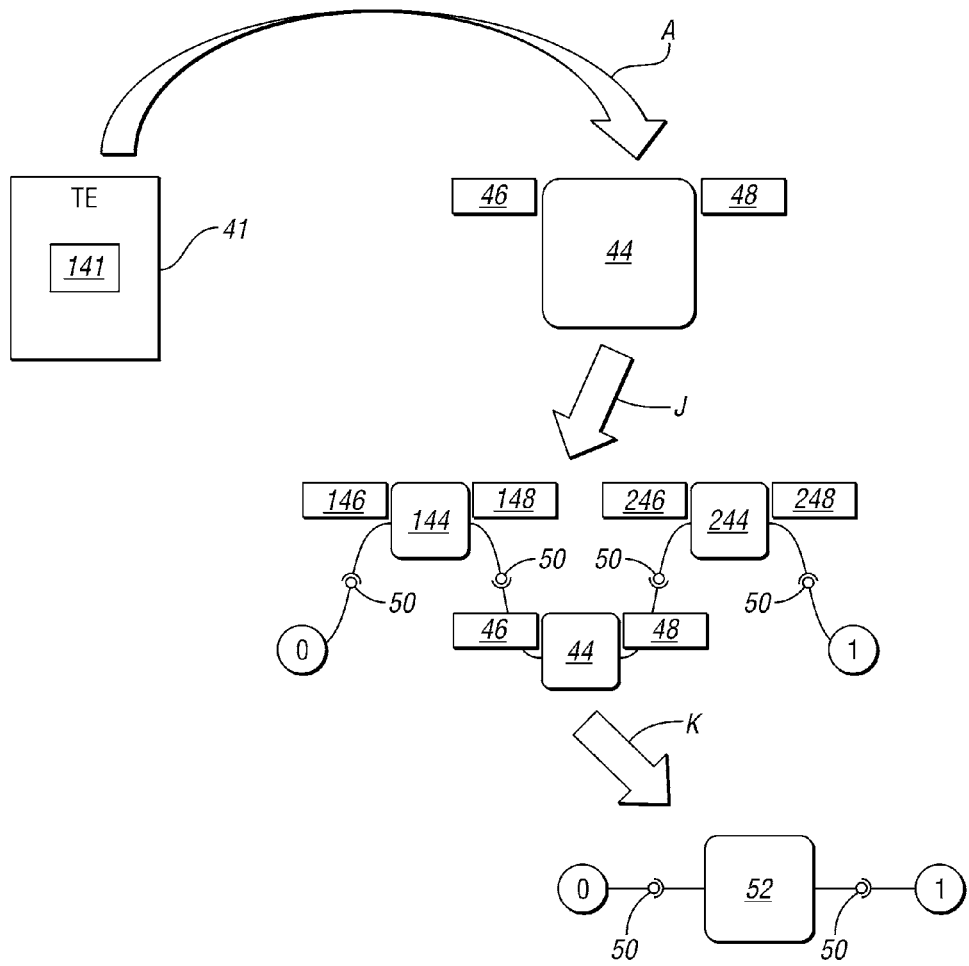
FIG. 2 is a schematic flow diagram describing program development using the RTC of the system shown in FIG. 1.

Referring to FIG. 2, the RTC 13 shown schematically in FIG. 1 facilitates program development at the task planning phase of control. While shown linearly for simplicity, a single event could also trigger multiple blocks concurrently, thereby initiating a concurrent/parallel processing pipeline. However, a linear sequence will be described herein for illustrative consistency.

A user of the RTC 13 may load the GUI 22 from any computer device on which it is available and write source code 141 using the text editor 41. In a possible embodiment, the source code 141 may be written using the Python programming language, e.g., Python 3.3.0 or later releases, Lua, or other scripting languages. Python and Lua are two non-limiting examples of interpretive programming languages that are well suited for application development and task prototyping, and that run on various platforms including Windows, Linux/Unix, Mac OS X, OS/2, and Amiga.

Features of Python and Lua, which should be shared by any other scripting language used in alternative embodiments, include clear, readable syntax and a natural expression of procedural code. Such code, unlike non-scripting languages such as C++, do not require compiling and linking steps. While other interpretive programming languages may be used via the text editor 41 without departing from the intended inventive scope, similar capabilities would facilitate the effective use of the RTC 13. The example flow diagram of FIG. 2 includes some basic illustrative blocks, including I/O connections and state identifiers. Each block represents an interpretative program for a particular task or function of the robots 12 or 14. Left undefined, i.e., "abstract", is the specific hardware which is to be tied into the particular I/O connections. Defined only is the type of data, e.g., joint velocity, joint position, RGBD image, etc., that the script must input or output.

A user, via the GUI 22 of FIG. 1, thus writes and/or selects code library blocks 44 and drops them into a programming screen of the GUI 22. Clicking on an individual block may open up a window in the GUI 22 to display information or menus, e.g., tabs displaying the various script engines 20 that may be selected (a "settings" tab), modifiable parameters a user can set for that particular instance of the script in the current task sequence (a "parameters" tab), etc. Thus, when a user writes new script in the text editor 41, there are code "hooks" allowing the user to create new code variables with values that are deferred until the user defines the values of these variables in the higher-level application, i.e., the task sequence block 52. When a new instance of the script block is dragged and dropped in a new task sequence block 52, these variables, along with editable text windows, are displayed. The user can then modify the values of those variables such that the user-set values are interpreted during execution.

Individual scripts of source code 141 written via the text editor 41, each describing a step or steps of a certain top-level task, may be stored in the centralized library of memory within the GUI 22 as the code library blocks 44, with each code library block 44 providing a visual representation of the underlying programming code at a given computational node within the system 10 of FIG. 1. Each code library block 44 may have an arbitrary number of input connections 46 and output connections 48 respectively to and from other library blocks as well as third party applications. These connections capture the data flow paths into, out of, and among the blocks 44 in an application during deployment. The actual number of respective input and output connections 46 and 48 may vary, with one of each shown for illustrative simplicity. The input connection 46 forms a pointer to incoming data, e.g., a color image from a camera connected as a hardware element to one of the robots 12 or 14 of FIG. 1 or a sensor reading a joint position. Likewise, the output connection 48 is a pointer to processed output data, e.g., a black and white processed version of the same image, or a corresponding joint command using the same examples. The RTC 13 of FIG. 1 thus defines the type, but not the source, of the various inputs and outputs for a given code library block 44.

In the IDE provided by the RTC 13 of FIG. 1, and as noted above, a VPL environment may be used to "drag and drop" existing code library blocks 44 into a desired task sequence. The task sequence in turn may be stored in the library within memory (M) of FIG. 1. A simplified example is shown in FIG. 2 with the code library block 44 being "dragged and dropped", as indicated by arrow J, in another window to form a task sequence with other code library blocks 144 and 244. Each of the other code library blocks 144 and 244 may have, like the code library block 44, a set of input and output connections. These are shown as input connections 146, 246 and output connections 148, 248 for the respective code library blocks 144 and 244.

Multiple respective input and/or output connections 46 and/or 48 in a given sequence may be linked together and exposed in the "higher level" task sequence block 52. For simplicity, I/O connections analogous to connections 46 and 48 are not shown on the task sequence block 52, as they reside in the RTC GUI 22 when such exposure occurs. For instance, if different output connections 46, 146 both point or connect to the same image data, the output connections 46 and 146 could be linked together by parameterizing these connections with the same name in the task sequence block 52. In order to be executable by a given script engine 20, all task sequence blocks 52 must have a start and stop state to indicate the entry and exit points of the program flow of that sequence 52 when it is run as an application, or as a sub-task in a higher-level application. The task sequence has a start state (0) and an end state (1). Between some or all of the code library blocks 44, 144, 244, sensor data 50 may be received and used in the execution of the next code library block in that sequence, which once again may be linear or non-linear, e.g., with possible concurrent or parallel execution of one or more steps.

As indicated by arrow K of FIG. 2, the entire task sequence may be stored in the centralized library within memory of the GUI 22 or in another accessible location as a task sequence block 52. As a result, in building other task sequences, the task sequence block 52 may be reused by dragging and dropping the task sequence block 52 into a VPL window, e.g., of the GUI 22 shown in FIG. 1, and writing additional code library blocks, and/or dragging and dropping existing code library blocks. One working within a VPL window could click on the task sequence block 52 to open the underlying structure, which may consist of additional task sequence blocks 52 and/or code library blocks 44. Thus, during deployment, when a user presses "play" from the GUI 22 on a given sequence block, all of the blocks for the sequence download over the NTL 25 to one or more designated script engines 20, loading into the local memory M of the script engine(s).

Clicking on a given code library block of any type causes the text editor 41 to open, such that the underlying code 141 is visible to the user. One can use the text editor 41 of FIG. 2 during program development to associate a particular state or status of a given code library block 44 or task sequence block 52 with, for instance, a color such as green, yellow, or red. Via the GUI 22, one may then later view the status of each block 44 or 52 at runtime and can click on a given block 44 or 52 to thereby "drill down" to the next level of the task sequence and view the status of sub-blocks in the application hierarchy in real time.

Initially, the centralized library may reside on the side of the GUI 22. That is, any pre-existing code library blocks 44 may be stored in in a directory on any computer from which the GUI 22 is run, and viewed via the file browser B shown in FIG. 1. Any newly-created code library blocks 44 may also be saved to the same directory. Because one might run the GUI 22 on a different physical device from that of the various script engines 20 executing the underlying scripts, pressing "play" to launch a given task sequence via the GUI 22 results in downloading, over the NTL 25, of all associated code library blocks 44 to the required script engine(s) 20, where the blocks 44 may be stored in local memory (M) of the physical computer device(s) making up each script engine 20.

Any script engine 20 having the top-most level block or "start" block then issues a trigger command, again over the NTL 25, to all script engines 20 in the control network 10 of FIG. 1. If any of the notified script engines 20 have loaded code library blocks 44 connected in a sequence to the "start" block, then those particular script engines 20 begin executing those blocks 44, and so on. For each code library block 44, the I/O connections effectively become the only required plug-ins prior to deployment for customizing an otherwise abstract task program, which is built entirely of the individual code library blocks 44, for use by a specific robot 12 or 14 (see FIG. 1).

To revisit a point made above, all of the code library blocks 44 remain abstract at the level of the RTC 13, while task sequence blocks 52 may or may not remain abstract. "Abstract" blocks of any type are not readily usable by third party hardware and software. Thus, the RTC 13 and/or the control modules 21, 31 connected to the RTC 13 over the NTL 25 of FIG. 1 must take additional steps to render these abstract blocks useable at the level of the control modules 21, 31. This approach will now be explained with reference to FIG. 3.

Figure 3:
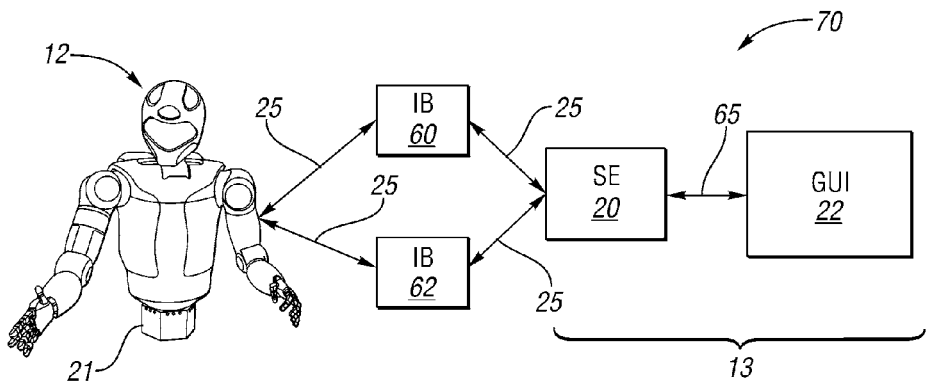
FIG. 3 is a schematic flow diagram describing robotic task planning using the RTC.

Referring to FIG. 3, an example task planning diagram 70 is shown using a simplified system in which just one robot is used, in this example the robot 12. Adding additional robots and additional script engines 20 does not change the present approach, although it would add additional computational nodes. For simplicity, only one script engine 20 is shown, although as explained below with reference to FIG. 4 any number of script engines 20 may be used in various embodiments. The GUI 22 can be used to drag and drop the necessary code library blocks for building a task or a task sequence, as explained above with reference to FIG. 2. Double-headed arrow 65 represents the two-way flow of information to and from the GUI 22 and the script engine 20.

The building of a given task sequence, particularly in a VPL environment, effectively creates a finite state machine. While a single state machine is shown for simplicity, and thus one computational node, more nodes may be used, with each node communicating via the NTL 25. A finite state machine as used herein is any device that stores a status/state and can operate on an input to change that status/state, and/or cause an action or output to take place for any given change.

Each script engine 20 communicates across the NTL 25 with the robot 12 without regard to the particular operating systems or computational engines used by the robot(s). Different hardware devices of the robot 12 are used in the execution of a given task. For example, the robot 12 may use a 3D camera (not shown) to view the object 11 shown in FIG. 1 in preparation for grasping the object 11. Proximity, force, and/or other sensors may be used as part of the control logic for executing a grasp, whether of the object 11 or of a different device. Data from the various hardware devices of the robot 12 is transmitted over the NTL 25 to the script engine 20. After any hardware element outputs a value, the data must be "published" to the network, as that term is known in the art, such that any networked devices, or other script engines 20, communicating over the NTL 25 can access the data.

Thus, each hardware module may include a corresponding interpreter block (IB) 60, 62 which interprets the raw data and publishes it to the network. Interpreter blocks 60, 62 act as sensory processing nodes. The interpreter blocks 60, 62 may use stand-alone software packages such as but not limited to the open-source Robot Operating System (ROS) maintained by Open Source Robotics Foundation (OSRF), i.e., an open source protocol for communicating over the NTL 25 between the various hardware modules and the robot 12, allowing both standard message passing protocols and data types as well as various code libraries or modules that can process sensor data or compute robot behavioral plans. That is, ROS provides standard network protocol and operating system services such as hardware abstraction, device drivers, libraries, message-passing, package management, hardware abstraction, and low-level device control, as is well known in the art. The message passing protocol of ROS may be used herein to access I/O data over the NTL 25, although other $3^{rd}$ party networking libraries may be used such as ZeroMQ from iMatix Corporation.

Referring to FIG. 4, a method 100 is shown for task planning within a distributed environment, such within the control network 10 of FIG. 1. Beginning at step 102, the RTC 13 is initialized, thereby establishing or verifying network connectivity with the robots being controlled. The method 100 then proceeds to step 104.

Step 104 entails accessing the centralized library, which may exist within memory of any computer device embodying or hosting the GUI 22, e.g., by clicking on an icon displayed within a window of the GUI 22. The method 100 then proceeds to step 106.

At step 106, a user determines whether code library blocks 44 exist in the centralized library for the particular task that is being planned. If not, the method 100 proceeds to step 108. However, if sufficient code library blocks 44 exist in the centralized library, the method 100 proceeds instead to step 112.

At step 108, a user may open a programming window via the GUI 22 and begins to write programming code, e.g., Python or Lua code, suitable for a given step or steps of the task. Each step of the task may be stored as a new code library block 44 or task sequence block 52 in the centralized library at step 110. The method 100 proceeds from step 110 to step 112 once all necessary code has been written or dragged and dropped.

At step 112, the user opens a VPL window via the GUI 22 and drags and drops the developed code library blocks 44 to build a desired task sequence. A simplified version of this with code library blocks 44, 144, and 244 is shown in FIG. 2 and described above. One or more task sequence blocks 52 can be built in this manner and stored in the centralized library at step 114 using as many of the linked code library blocks 44 as are required for the desired task.

Step 116 includes assigning the I/O devices to the code library blocks 44 via the input block 46, which as noted above forms a pointer to incoming data. Also as part of step 116, the output block 48 may be assigned. The RTC 13 is thus used at step 116 to define the type of the inputs and outputs for each code library block 44. As part of this step, prior to deployment, a user may choose whether or not to "re-bind" the I/O connections to point to different sources or destinations in the data flow. For example, one could re-bind by clicking on the input block 46 or output block 48, which may display text associating each with variables in the code of the particular block, at which time a dialog window may be presented with a text field that allows the user to type in the specific destination or source, i.e., the pointer to the data as mentioned above, such as by typing "left_eye_camera_rgb_image" in one runtime control context or "right_eye_camera_rgb_image" in another.

Once this is done, the tasks are executed at step 118, which includes downloading the code blocks 44 or 52 to the required script engine(s) 20 of FIG. 1. Part of this step may include having the user select the particular script engine(s) 20 to dispatch to, or step 118 may simply default to one or more script engines 20. At step 118, the script engine(s) 20 interpret the underlying programming code, transfer of any I/O data over the NTL 25, and handle any transitions between the task sequences and the associated code library blocks 44.

Furthermore, as the script engines 20 of FIG. 1 are "distributed" throughout the control network 10 of the same Figure, a user who wishes to assign the entire application to a single script engine 20 may do so. Likewise, if the user wishes to execute each individual code library block 44 and/or task sequence block 52 on different script engines 20, the user may do that as well, or anything in the spectrum between these example extremes. As noted above, a key feature of the RTC 13 shown in FIG. 1 and described in detail above is that the RTC 13 will handle the program flow of any and all task sequences even in a situation in which each block 44 or 52 is distributed across the control network 10 of FIG. 1. Program flow between different script engines 20 is handled over the NTL 25. Thus, as part of the flow shown in FIG. 4, the user could assign particular blocks 44 or 52 to specific script engines 20 to optimize processing efficiency and balance the computational load.

Ultimately in step 118, any required lower level controllers, e.g., the control modules 21, 31 of FIG. 1, are instructed to take some action such as move one or more joints and/or end effectors, according to the task code interpreted by the script engine(s) 20. Upon receipt of the task, the control modules 21, 31 thereafter control the various joint motors and/or other joint actuators as needed to move according to the task from the RTC 13.

While the best modes for carrying out the invention have been described in detail, those familiar with the art to which this invention relates will recognize various alternative designs and embodiments for practicing the invention within the scope of the appended claims.

The invention claimed is:

1. A system comprising:
    a robot having a control module, wherein the control module is configured to control motion of the robot in response to a received task sequence; and
    a robot task commander (RTC) in networked communication with the control module over a network transport layer (NTL), and having:
        at least one script engine;
        a processor;
        tangible, non-transitory memory; and
        a graphical user interface (GUI) having a text editor and a file browser, wherein the GUI is configured to provide access to the text editor, and, via the file browser, to a centralized library of code library blocks in the memory, each constructed using the text editor from an interpretive language computer programming code, and each having an input and an output block forming pointers to required input and output data, and providing a Visual Programming Language (VPL) tool and the text editor;
    wherein the system is configured to execute instructions from the memory via the at least one script engine and the processor to thereby open the VPL tool, build and store the task sequence for the robot using at least some of the stored code library blocks, assign data to the input and output connections identifying the required input and output data for each library code block, and transmit the task sequence to the control module over the NTL.

2. The system of claim 1, wherein the RTC displays on-line feedback of state and telemetry data of the robot via the GUI at runtime of the task sequence to thereby enable diagnostics of an execution of the task sequence in real time.

3. The system of claim 1, wherein the input and output connections are the only plug-ins used for customizing the task sequence for execution by the robot.

4. The system of claim 1, wherein the robot includes a first robot having up to 6 degrees of freedom and a second robot having at least 42 degrees of freedom.

5. The system of claim 1, wherein the interpretive language is one of the Python and the Lua programming languages.

6. The system of claim 1, wherein the robot includes a hardware element having an interpreter block which interprets raw data from the hardware element and publishes the interpreted raw data to the network over the NTL, and wherein the RTC is in communication with the interpreter block over the NTL.

7. A method comprising:
    placing a robot task commander (RTC) in networked communication with a control module of a robot over a network transport layer (NTL), wherein the RTC includes and at least one script engine and a graphical user interface (GUI) having a text editor and a file browser;
    developing a task sequence via the GUI, including:
        opening a Visual Programming Language (VPL) environment and the text editor;
        constructing, via the text editor, a set of code library blocks using an interpretive language computer programming code;
        storing a task sequence from a plurality of the constructed code library blocks in memory, wherein each code library block includes a corresponding input and output connection;
        assigning data to the input and output connections identifying required input and output data for each of the code library blocks forming the task sequence; and
        transmitting the stored task sequence to at least one script engine over the NTL;
    processing the stored task sequence via the at least one script engine; and
    controlling, via the control module, a motion of the robot in response to the processed task sequence.

8. The method of claim 7, further comprising: displaying state and telemetry data of the robot at runtime via the GUI.

9. The method of claim 7, wherein the I/O connections are the only plug-ins used for customizing the task sequence for execution by the robot.

10. The method of claim 7, wherein the robot includes a first robot having up to 6 degrees of freedom and a first control module, and a second robot having at least 42 degrees of freedom and a second control module, and wherein transmitting the stored task sequence to the control module includes transmitting different stored task sequences to each of the first and second control modules.

11. The method of claim 7, wherein the interpretive language is one the Python and the Lua programming languages.

12. The method of claim 7, wherein the robot includes a hardware element having an interpreter block, further comprising:
    interpreting raw data from the hardware element via the interpreter block; and
    publishing the raw data to the network over the NTL.

13. A robot task commander (RTC) in networked communication with a plurality of control modules for a matching plurality of robots over a network transport layer (NTL), wherein the control module controls task execution of a corresponding one of the robots, the RTC comprising:

a plurality of script engines;
at least one processor;
a graphical user interface (GUI) providing access to a text editor and to a Visual Programming Language (VPL) environment; and
tangible, non-transitory memory;
wherein the at processor is configured to execute instructions from the memory, via the processor, to thereby:
   receive a task sequence for at least one of the robots from one of the text editor and the VPL environment;
   store the task sequence in the memory as a set of code library blocks;
   assign data to an input and an output connection of the code library blocks identifying respective input and output data for each code library block;
   transmit the task sequence to the plurality of script engines over the NTL;
   process the task sequence via the plurality of script engines; and
   transmit the processes task sequence to the control module of at least one of the robots over the NTL to thereby command execution of the task sequence by the at least one robot;
   wherein the GUI is configured to display on-line feedback of state and telemetry data at runtime to enable diagnostics of the execution of the task sequence in real time.

14. The RTC of claim 13, wherein the RTC is in networked communication with different control modules over the NTL, with each of the different control modules controlling task execution of a respective one of the plurality of robots.

15. The RTC of claim 14, wherein one of the robots has at least 42 degrees of freedom.

16. The RTC of claim 13, wherein the input and output connections are the only plug-ins used for customizing the task sequence for execution by the robots.

17. The RTC of claim 13, wherein the interpretive language is one of the Python and the Lua programming languages.

18. The RTC of claim 13, wherein each of the robots include a hardware element having an interpreter block which interprets raw data from the hardware element and publishes the interpreted raw data to the network over the NTL, and wherein the RTC is in communication with the interpreter block via the NTL.

\* \* \* \* \*